US012713235B2

(12) United States Patent
Ding et al.

(10) Patent No.: US 12,713,235 B2
(45) Date of Patent: Aug. 18, 2026

(54) AUTOMATED FREQUENCY COORDINATION AUTHENTICATION

(71) Applicant: TP-LINK CORPORATION PTE. LTD., Singapore (SG)

(72) Inventors: Tong Ding, Chengdu (CN); Haojie Zhang, Chengdu (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 266 days.

(21) Appl. No.: 18/677,918

(22) Filed: May 30, 2024

(65) Prior Publication Data

US 2025/0374044 A1 Dec. 4, 2025

(51) Int. Cl.
*H04W 12/06* (2021.01)
*H04W 28/24* (2009.01)
*H04W 52/36* (2009.01)
*H04W 92/10* (2009.01)

(52) U.S. Cl.
CPC ........... *H04W 12/06* (2013.01); *H04W 28/24* (2013.01); *H04W 52/367* (2013.01); *H04W 92/10* (2013.01)

(58) Field of Classification Search
CPC .............................. H04W 12/06; H04W 28/24
See application file for complete search history.

(56) References Cited

U.S. PATENT DOCUMENTS

2020/0359229 A1* 11/2020 Macmullan .......... H04W 24/02
2021/0120556 A1 4/2021 Segev
2023/0379128 A1 11/2023 Wang
2024/0098615 A1 3/2024 Anantharaman
2024/0171988 A1 5/2024 Swartz
2024/0172142 A1 5/2024 Kuriki

FOREIGN PATENT DOCUMENTS

CN 114128338 A 3/2022
CN 117156391 A 12/2023

OTHER PUBLICATIONS

International Search Report and Written Opinion issued in App. No. PCT/US2025/030272, dated Aug. 6, 2025, 11 pages.

* cited by examiner

*Primary Examiner* — Myron Wyche
(74) *Attorney, Agent, or Firm* — Loeb & Loeb LLP

(57) ABSTRACT

Disclosed are a method, a device and a computer program product for automated frequency coordination (AFC) authentication of a communication device. An AFC response, including information indicating available frequency spectrum and power constraints thereon for the communication device, may be received. An occasion for updating operating power on an operating channel, the operating channel, or the operating channel and the operating power thereon of a wireless communication interface of the communication device may be determined based on states of the wireless communication interface. The operating power on the operating channel, the operating channel, or the operating channel and the operating power thereon may be updated based at least in part on the power constraints on the available frequency spectrum at the occasion for updating.

20 Claims, 8 Drawing Sheets

800 start

S802 GPS location information is acquirable?

Yes

S804 selecting the GPS location information as the location information

No

S806 cellphone location information is acquirable?

Yes

S808 selecting the cellphone location information as the location information

No

S810 WiFi location information is acquirable?

Yes

S812 selecting the WiFi location information as the location information

No

S814 network location information is acquirable?

Yes

S816 selecting the network location information as the location information

No

S818 setting the location information of the communication device as null

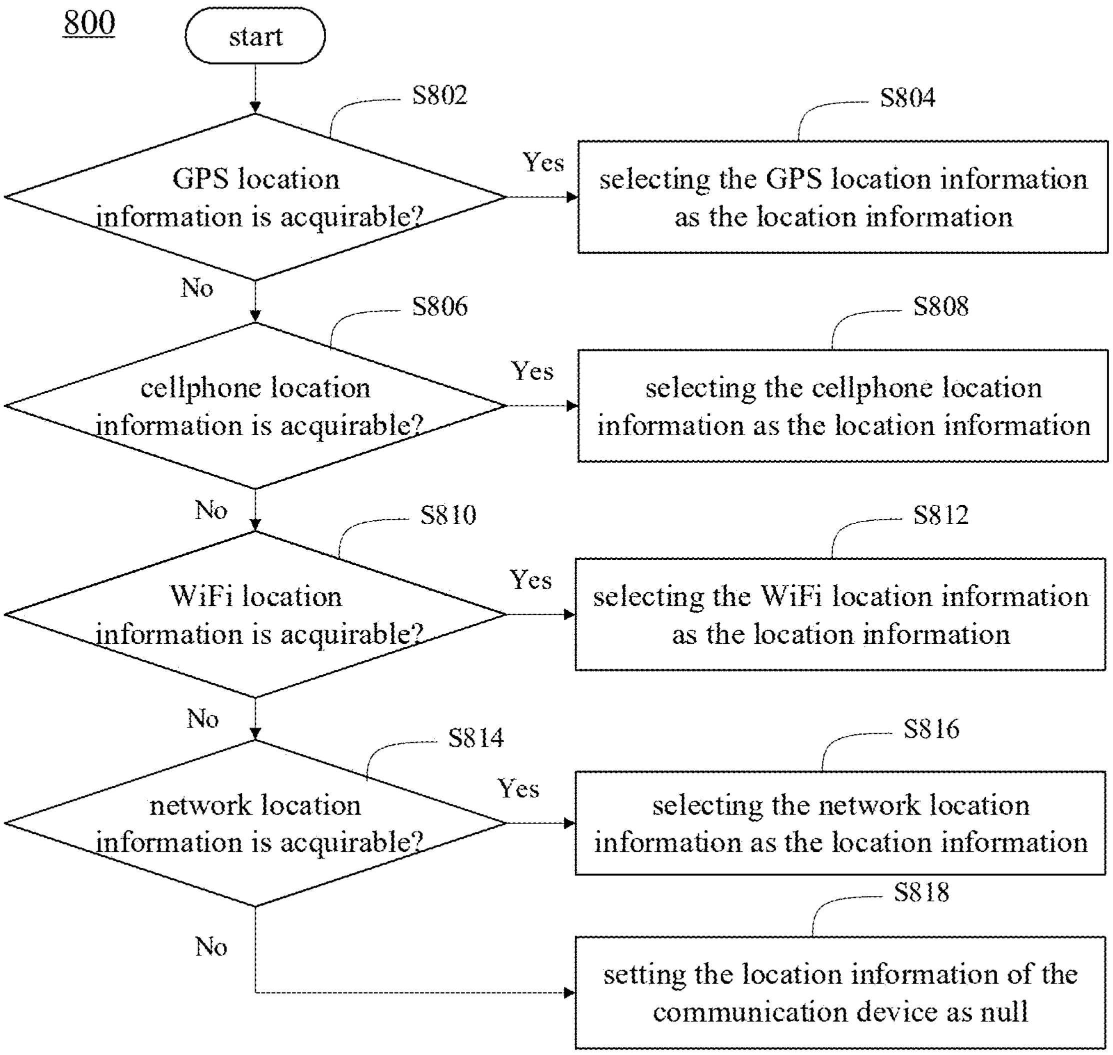

FIG. 8

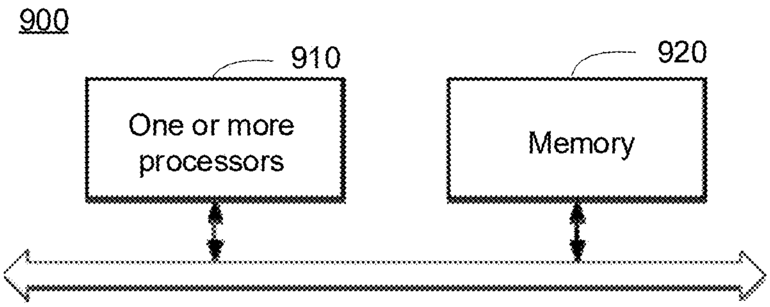

FIG. 9

AUTOMATED FREQUENCY COORDINATION AUTHENTICATION

TECHNICAL FIELD

The present disclosure relates to wireless device management, and in particular, to methods, devices and computer program products for automated frequency coordination (AFC) authentication of a communication device.

BACKGROUND

With the use of consumer devices capable of providing wireless communication continuously expanding over the last few decades, radio frequency resources allocated to wireless communication have become increasingly congested. A wireless communication frequency band, e.g., a 6 Gigahertz (GHz) band, may be utilized for communication by incumbent radios. Other devices, e.g., WiFi radios, may be required to honor the incumbent radios, when using the wireless communication frequency band. For example, a transmission power of non-incumbent radios, e.g., WiFi radios, may be restricted, for example, to ensure that any interference from the non-incumbent radios to the incumbent radios will be low enough, e.g., 6 decibel (dB) below received incumbent signal power. As the demand for wireless communication continues to increase, further improvements in frequency coordination technologies remain useful.

SUMMARY

In accordance with one embodiment of the present disclosure, there is provided a method for automated frequency coordination (AFC) authentication of a communication device. In the method, an AFC response, including information indicating available frequency spectrum and power constraints thereon for the communication device, may be received. An occasion for updating operating power on an operating channel, the operating channel, or the operating channel and the operating power thereon of a wireless communication interface of the communication device may be determined based on states of the wireless communication interface. The operating power on the operating channel, the operating channel, or the operating channel and the operating power thereon may be updated based at least in part on the power constraints on the available frequency spectrum at the occasion for updating.

In accordance with another embodiment of the present disclosure, there is provided a communication device. The communication device may comprise one or more processors; a memory coupled to at least one of the processors; and a set of computer program instructions stored in the memory. When executed by at least one of the processors, the set of computer program instructions may perform the following actions: receiving an Automated Frequency Coordination (AFC) response, including information indicating available frequency spectrum and power constraints thereon for the communication device; determining an occasion for updating operating power on an operating channel, the operating channel, or the operating channel and the operating power thereon of a wireless communication interface of the communication device based on states of the wireless communication interface; and updating the operating power on the operating channel, the operating channel, or the operating channel and the operating power thereon of a wireless communication interface of the communication device based at least in part on the power constraints on the available frequency spectrum at the occasion for updating.

In accordance with a further embodiment of the present disclosure, there is provided a computer program product for automated frequency coordination (AFC) authentication of a communication device. The computer program product may comprise a non-transitory computer readable storage medium having program instructions embodied therewith. The program instructions are executable by a processor to cause the processor to: receive an AFC response, including information indicating available frequency spectrum and power constraints thereon for the communication device; determine an occasion for updating operating power on an operating channel, the operating channel, or the operating channel and the operating power thereon of a wireless communication interface of the communication device based on states of the wireless communication interface; and update the operating power on the operating channel, the operating channel, or the operating channel and the operating power thereon based at least in part on the power constraints on the available frequency spectrum at the occasion for updating.

In accordance with the embodiments of the present disclosure, through determining the occasion to update the operating power on the operating channel, the operating channel, or the operating channel and the operating power thereon based on states of the wireless communication interface, dreadful effects such as throughput decline, signals disappearing, device disconnection, etc. may be avoid, providing improved user experience.

BRIEF DESCRIPTION OF THE DRAWINGS

For the purpose that the present disclosure may be understood in detail, a more particular description of the present disclosure, briefly summarized above, may be made by reference to embodiments, some of which are illustrated in the accompanying drawings, in which the same reference generally refers to the same components in the embodiments of the present disclosure.

FIG. 8 shows a flowchart illustrating an exemplary positioning selection method 800 in accordance with some embodiments of the present disclosure; and FIG. 9 shows a system 900 of AFC authentication of a communication device in accordance with some embodiments of the present disclosure.

Figure 1:
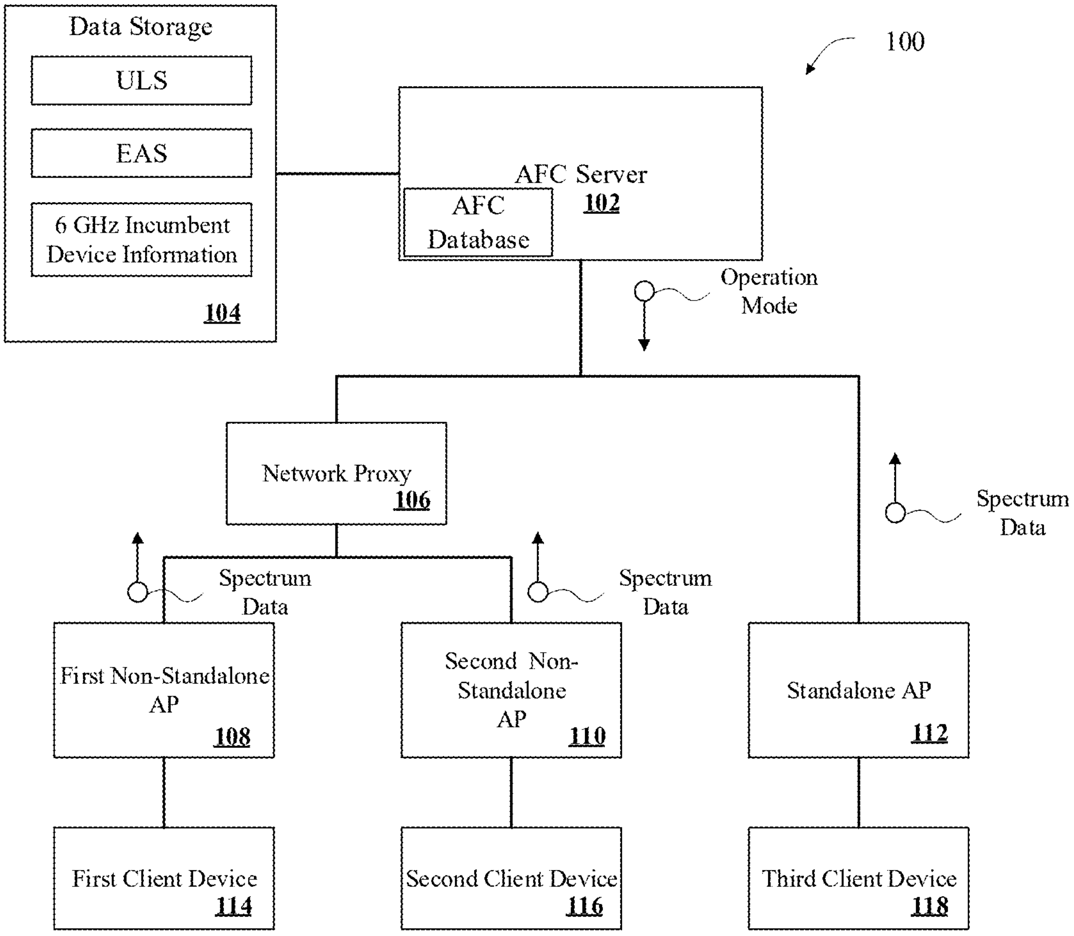
FIG. 1 illustrates a block diagram of an example automated frequency coordination (AFC) system 100 in accordance with some embodiments of the present disclosure.

One skilled in the art will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

The following detailed description refers to the accompanying drawings. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, “determining”, “reading”, “updating”, “obtaining”, “selecting”, “parsing”, “transferring” or the like, may refer to operation(s) and/or process(es) of a computer, a computing platform, a computing system, or other electronic computing device, that manipulate and/or transform data represented as physical (e.g., electronic) quantities within the computer’s registers and/or memories into other data similarly represented as physical quantities within the computer’s registers and/or memories or other information storage medium that may store instructions to perform operations and/or processes.

References to “one aspect”, “an aspect”, “demonstrative aspect”, “various aspects” etc., indicate that the aspect(s) so described may include a particular feature, structure, or characteristic, but not every aspect necessarily includes the particular feature, structure, or characteristic. Further, repeated use of the phrase “in one aspect” does not necessarily refer to the same aspect, although it may.

As used herein, unless otherwise specified the use of the ordinal adjectives “first”, “second”, “third” etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term “wireless device”, as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term “wireless device” may optionally include a wireless service.

The term “communicating” as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase “communicating a signal” may refer to the action of transmitting the signal by a first device, and may not necessarily include the action of receiving the signal by a second device. In another example, the phrase “communicating a signal” may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

Some demonstrative aspects may be used in conjunction with a wireless communication network communicating over a 6 Gigahertz (GHz) frequency band. However, other aspects may be implemented utilizing any other suitable wireless communication frequency bands, for example, a 2.4 GHz frequency band, a 5 GHz frequency band, an Extremely High Frequency (EHF) band (the millimeter wave (mmWave) frequency band), e.g., a frequency band within the frequency band of between 20 GHz and 300 GHz, a frequency band above 45 GHz, a 5G frequency band, a frequency band below 20 GHz, e.g., a Sub 1 GHz (S1G) band, a WLAN frequency band, and the like.

Recently, the Federal Communications Commission (FCC) approved the use of the 6 GHz frequency band for wireless communication (e.g., Wi-Fi or similar broadband technology) with unlicensed devices on the condition that unlicensed devices do not interfere with devices (also referred to as licensed devices) that have received licenses to use the 6 GHz frequency band. The 6 GHz frequency band is a spectrum of radio frequencies ranging from 5.925 GHz to 7.125 GHz (or 1200 MHz of spectrum). This spectrum addition to wireless capability is an expansion that adds upwards of one hundred channels for unlicensed devices to utilize.

In association with 6 GHz Wi-Fi communications, the FCC requires that predicted interference-to-noise (I/N) ratios at any existing 6 GHz receivers (e.g., incumbent systems or users such as users licensed to operate in 6 GHz frequency band) are to not exceed −6 dB (or a predetermined dB). In some circumstances, an access point (AP) seeking deployment may demonstrate or validate that communications in the 6 GHz frequency band are not exceed the −6 dB I/N ratio through a lab testing and/or a field testing. In some circumstances, without the −6 dB I/N ratio validation, the AP may only be operated in a low power indoor (LPI) mode (e.g., AP using 18 dBm in 20 MHz channel width).

The FCC has issued a mandate that 6 GHz access points (AP) obtain authorization from an automated frequency coordination (AFC) system (e.g., AFC system (server) in the region) before operating in a standard power mode (e.g., mode that generates a maximum transmission power of 36 dBm). In some circumstances, an AFC database may be configured to store devices and/or associated frequencies configured to communicate in the 6 GHz frequencies. For example, the FCC may request and/or require incumbent 6 GHz users to register their devices in an AFC database. In some embodiments, the AFC database is based on FCC database (6 GHz incumbent device registration database), universal licensing system (ULS) database, and/or equipment authorization system (EAS) database.

An AP configured to transmit 6 GHz frequencies (also referred as 6 GHz AP or 6 GHz Wi-Fi AP) is configured to access the AFC database. The 6 GHz AP may be configured to determine frequencies in the AFC database relative to the frequencies of operation of the 6 GHz AP. In instances in which a 6 GHz AP fails to access and/or compare operational frequencies to the registered frequencies in the AFC database, the 6 GHz AP may be limited to communications in a low power mode (e.g., low power indoor (LPI) mode).

FIG. 1 illustrates a block diagram of an example automated frequency coordination (AFC) system 100 in accordance with some embodiments of the present disclosure. In some embodiments, the AFC system 100 includes an AFC server 102 and a data storage 104 (e.g., internal data storage, external data storage) in communication with the AFC server 102. In some embodiments, the AFC system 100 also includes a network proxy 106, a first non-standalone AP 108, a second non-standalone AP 110, a standalone AP 112 (referred to collectively as the APs), a first client device 114 in communication with the first non-standalone AP 108, a second client device 116 in communication with the second non-standalone AP 110, and a third client device 118 in communication with standalone AP 112.

In some embodiments, the data storage 104 includes one or more regulatory databases (e.g., universal licensing system (ULS) database, equipment authorization system (EAS) database). In some implementations, the data storage 104 includes at least incumbent systems and/or incumbent devices that may be configured to transmit using 6 GHz communications. For example, the universal licensing system (ULS) database may include a collection of licenses issued for communications using 6 GHz communications, such as a list of microwave links configured to transmit using a frequency between 5925 MHz and 7125 MHz. In some embodiments, the data storage 104 is managed by a regulatory agency, such as the Federal Communications Commission (FCC). In other words, the data storage 104 may be an external data storage in communication with the AFC server 102.

In some embodiments, the AFC server 102 is configured to obtain at least a portion of data from the data storage 104. For example, the AFC server 102 may be configured to obtain microwave links, such as from incumbent systems and/or incumbent devices, within a geographic area. Alternatively, or additionally, in some implementations, the AFC server 102 is configured to receive operational characteristics from an AP and/or a proxy, such as the standalone AP 112 and/or the network proxy 106, respectively. The operational characteristics may include a geolocation, a location confidence, an antenna height, an FCC ID, a serial number, and/or other device characteristics.

In some embodiments, the AFC server 102 is configured to determine a predicted interference-to-noise (I/N) ratio on an incumbent system based on received operational characteristics. AFC server 102 may use one or more models (e.g., computer modeling) to determine the predicted I/N ratio for an incumbent system based on a 6 GHz AP requesting to operate in a standard power mode. Example models may include a free space model, a WINNER II model, an Irregular Terrain Model, and/or other suitable models. Alternatively, or additionally, in some embodiments, the AFC server 102 is configured to use a spectrum analysis (e.g., frequency spectrum data) that may be provided by an AP (e.g., standalone AP 112) and/or a proxy (e.g., network proxy 106), that may be obtained from observed 6 GHz communications received by the AP or APs (e.g., first non-standalone AP 108, second non-standalone AP 110) associated with the proxy (e.g., network proxy 106), as described herein.

In some embodiments, the AFC server 102 is configured to provide one or more usable frequencies to a 6 GHz AP (e.g., Wi-Fi AP), which frequencies may not cause an I/N ratio greater than −6 dB. For example, the AFC server 102 may determine that a first 6 GHz frequency may cause an I/N ratio of less than a threshold (e.g., less than −6 dB) at an incumbent system, and the AFC server 102 may provide the first 6 GHz frequency for use by the 6 GHz AP.

In some embodiments, the APs (e.g., first non-standalone AP 108, second non-standalone AP 110, standalone AP 112) are Wi-Fi access points. In some embodiments, the APs are configured to provide at least 6 GHz Wi-Fi to devices that may be communicatively coupled to the APs. In some embodiments, as shown, the standalone AP 112 is configured to provide frequency spectrum data to the AFC server 102. Alternatively, or additionally, in some embodiments, the first non-standalone AP 108 and the second non-standalone AP 110 are configured to communicate the frequency spectrum data to the network proxy 106, and the network proxy 106 is configured to provide the frequency spectrum data to the AFC server 102. In some embodiments, the frequency spectrum data is communicated via a network such as the Internet. In some embodiments, the AFC server 102 uses the provided frequency spectrum data in subsequent determinations, such as an I/N ratio associated with incumbent systems. In some embodiments, the AFC server 102 uses the provided frequency spectrum data in subsequent determinations, such as an I/N ratio associated with incumbent systems along with other information (e.g., computer modeling, ULS, EAS, 6 GHz incumbent device information).

Modifications, additions, or omissions may be made to the AFC system 100 without departing from the scope of the present disclosure. For example, in some embodiments, the AFC system 100 may include any number of other components that may not be explicitly illustrated or described.

Figure 2A:
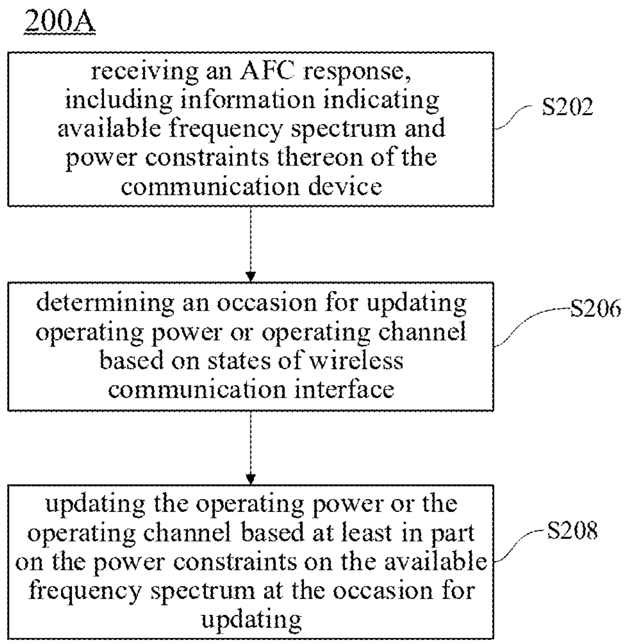
FIGS. 2A-2B show flowcharts illustrating exemplary methods 200A and 200B for AFC authentication of a communication device in accordance with some embodiments of the present disclosure.

FIG. 2A shows a flowchart illustrating an exemplary method 200A for AFC authentication of a communication device (e.g., standalone AP 112 in FIG. 1) in accordance with some embodiments of the present disclosure.

The method 200A, at step S202, includes receiving an AFC response, including information indicating available frequency spectrum and power constraints thereon for the communication device. In some embodiments, the AFC response may be received from an AFC server (e.g., AFC server 102 in FIG. 1). In some embodiments, the AFC response is responsive to an AFC inquiry request, for example, a channel availability request from the standalone AP 112 in FIG. 1. In some embodiments, the channel availability request may include one or more parameters associated with the communication device (e.g., standalone AP 112 in FIG. 1). In some embodiments, one or more parameters associated with the standalone AP 112 may include, for example, a power constraint, an AP identifier, AP location information (such as latitude, longitude, antenna Above Ground Level (AGL) height, horizontal uncertainty, vertical uncertainty), an AP effective isotropic radiated power (EIRP), a power spectral density (PSD), an AP category (e.g., whether the AP is indoors, outdoors, or mix). The AFC response referred herein may refer to a response to an AFC inquiry request, AFC request, AFC inquiry or AFC query, and it may be available spectrum inquiry response. Furthermore, any of the AFC inquiry request, AFC request, AFC inquiry and AFC query referred herein may be available spectrum inquiry request.

The available frequency spectrum may refer to a set of frequencies, including continuous ranges of frequencies or discontinuous ranges of frequencies. The available frequency spectrum may be represented by available frequency ranges or available channels. In some embodiments, the communication device (e.g., standalone AP 112 in FIG. 1) may request one or more of available frequency information or available channel information from the AFC system. The available frequency information may indicate one or more available frequency range. A contiguous frequency range may include one or more channels. In some embodiments, the available frequency spectrum may comprise at least one of available frequency ranges or available channels. If the available frequency spectrum comprises available channels, an optimal channel may be selected from the available channels as operating channel according to some conditions, for example, whether the available channel is occupied by a neighboring device, whether the available channel is congested, the power constraint on the available channel, and so on. If the available frequency spectrum comprises available frequency ranges, channels corresponding to each of the available frequency ranges may be calculated, and an optimal channel may be selected from the channels corresponding to the available frequency ranges as operating channel according to some conditions. If the available frequency spectrum comprises available frequency ranges and available channels, an optimal channel may be selected from the intersection between the available channels and the channels corresponding to the available frequency ranges as operating channel according to some conditions.

Here, available channel may refer to a channel that is available for use by the communication device (which may also be referred to as AFC device herein, e.g., standalone AP 112 in FIG. 1) given the location of the communication device. Furthermore, a power constraint on a channel herein may refer to a threshold operating power (e.g., maximum operating power) for the communication device to operate on the channel while located within a geofence. That is, if the standalone AP 112 operates at a power that exceeds the threshold of the power constraint, the standalone AP 112 risks interfering with one or more licensed devices. Therefore, in some configurations, based on the power constraint, the standalone AP 112 is only permitted to operate at a power equal to or less than the power constraint while located in the geofence.

After receiving the AFC response, including information indicating available frequency spectrum and power constraints thereon, the AP may select an optimal channel according to the available frequency spectrum as an operating channel, and may configure the operating channel or operating power on the operating channel of a radio frequency (RF) chip, if appropriate, based on the power constraint on the selected channel.

The method 200A, at step S206, includes determining an occasion for updating the operating power or the operating channel based on states of the wireless communication interface. In some embodiments, the wireless communication interface may be various wireless communication chips such as 802.11 chip, Bluetooth chip, and so on.

In some embodiments, the communication device may monitor the states of its communication interface (e.g., RF chip), including for example, throughput of the wireless communication interface, a number of clients (e.g., first client device 114, second client device 116 or third client device 118 in FIG. 1) in communication with the wireless communication interface, states of the clients (e.g., whether the clients are associated with multiple operating bands of the communication device), protocol and function supported by the client (e.g., whether the client supports band steering), validity period of an AFC authorization stored in the communication device, and so on, to determine the occasion for updating the operating power and/or the operating channel of the communication interface, so as to decline impacts on user experience when changing operating power and/or operating channel of the wireless communication interface as much as possible.

In some embodiments, the occasion meets one or more of the following conditions: throughput of the wireless communication interface is less than a throughput threshold at the occasion; a number of clients being communicating with the wireless communication interface is less than a quantity threshold at the occasion; the occasion is within a preset updating period (e.g., before dawn) of the wireless communication interface; or a validity period of an AFC authorization from the AFC response has not passed at the occasion.

Figure 3:
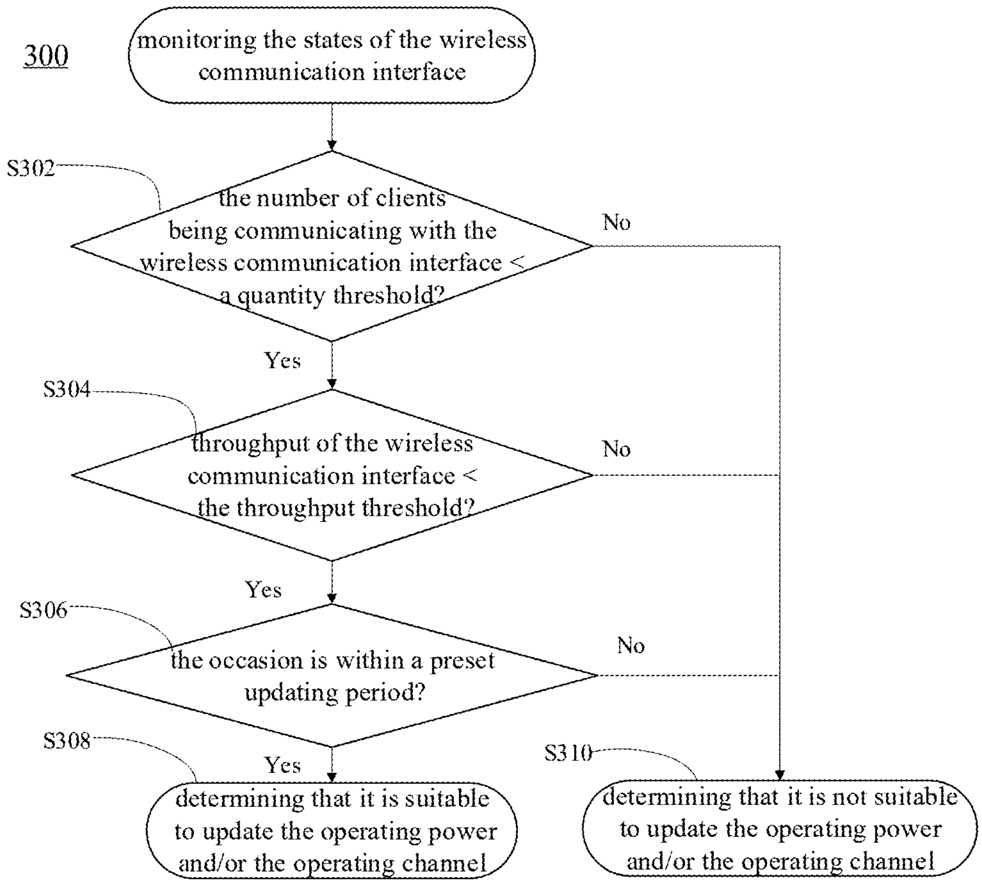
FIG. 3 shows a flowchart illustrating an exemplary process 300 of determining the occasion for updating the operating power and/or the operating channel of the wireless communication interface in accordance with some embodiments of the present disclosure.

FIG. 3 shows a flowchart illustrating an exemplary process 300 of determining the occasion for updating the operating power and/or the operating channel of the wireless communication interface in accordance with some embodiments of the present disclosure. The process 300 begins from monitoring the states of the wireless communication interface. At step S302, it is determined whether the number of clients being communicating with the wireless communication interface is less than a quantity threshold at the present occasion. If it is determined that the number of clients being communicating with the wireless communication interface is not less than the quantity threshold at the present occasion, the process 300 proceeds to step S310, determining that it is not suitable to update the operating power and/or the operating channel of the wireless communication interface. If it is determined that the number of clients being communicating with the wireless communication interface is less than the quantity threshold at the present occasion, the process 300 proceeds to step S304.

At step S304, it is determined whether the throughput of the wireless communication interface is less than a throughput threshold at the present occasion. If it is determined that the throughput of the wireless communication interface is not less than the throughput threshold at the present occasion, the process 300 proceeds to step S310. If it is determined that the throughput of the wireless communication interface is less than the throughput threshold at the present occasion, the process 300 proceeds to step S306.

At step S306, it is determined whether the present occasion is within a preset updating period (e.g., before dawn) of the wireless communication interface. If it is determined that the present occasion is not within the preset updating period, the process 300 proceeds to step S310. If it is determined that the present occasion is within the preset updating period, the process 300 proceeds to step S308. At step S308, it is determined that it is suitable to update the operating power and/or the operating channel. It should be noted that the order of steps S302-S306 may be changed.

Back to FIG. 2, the method 200A, at step S208, includes updating the operating power or the operating channel based at least in part on the power constraints on the available frequency spectrum at the occasion for updating. As mentioned above, the power constraint may indicate a maximum operating power. In some scenarios, the maximum operating power obtained from the AFC system may exceed the power constraint of the communication device per se. Under such circumstances, the operating power of the communication device (which may also be referred to as AFC device herein, e.g., standalone AP 112 in FIG. 1) is not updated directly with the obtained power constraint. In some embodiments, the operating power may be updated with a minimum value of the power constraint on an available channel selected as the operating channel, a hardware maximum power and an authenticated maximum power of the communication device.

As mentioned above, the AP may configure (e.g., update) the operating channel or operating power on the operating channel of a radio frequency (RF) chip, if appropriate. For the RF chips of different manufacturers, however, the procedures for configuring the operating channel or the operating power of the RF chips are different. For example, when configuring the operating channel or the operating power of certain RF chips, it is required to restart the RF chips, but for other RF chips, it is not required to restart these RF chips. Herein, the term "restart" may refer to the situation that the communication connection of the RF chip, for example, the communication connection between the RF chip and its client will be disconnected. In some embodiments, restarting a RF chip may refer to reloading the driver of the RF chip with the disconnection of the communication connection of the RF chip. When configuring the operating channel or the operating power of the RF chips that need to be restarted, user experience under certain scenarios may be affected. For example, after the AP receives data from the AFC system, indicating that the AP needs to change to another operating channel or the operating power of the current operating channel needs to be change, if the users are using the network at its peak, changing the operating channel or the operating power of the RF chip at this time may cause dreadful impacts such as throughput decline, signals disappearing, device disconnection, etc., incurring inconvenience to the users.

Figure 2B:
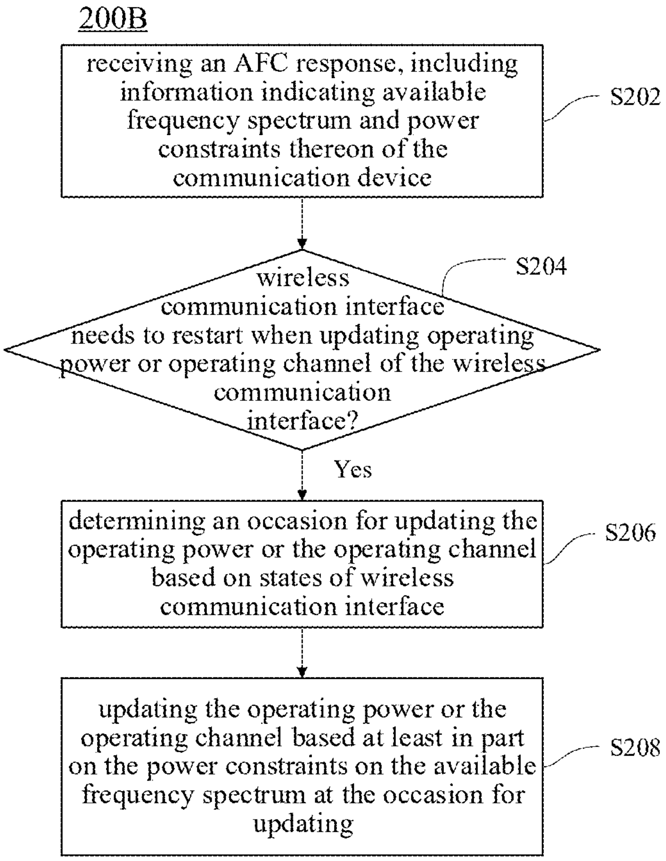

FIG. 2B shows a flowchart illustrating another exemplary method 200B for AFC authentication of a communication device (e.g., standalone AP 112 in FIG. 1) in accordance with some embodiments of the present disclosure. The method 200B includes steps S202 and S206 that are similar as those in the method 200A described with reference to FIG. 2A. The method 200B differs from the method 200A described with reference to FIG. 2A in that it further includes step S204 between steps S202 and S206. The method 200B, at step S204, includes, determining whether a wireless communication interface of the communication device needs to restart when updating operating power or operating channel of the wireless communication interface. In response to a requirement of restarting the wireless communication interface when updating operating power of the wireless communication interface ("Yes" determined at step S204), the method 200B proceeds to step S206 to determine the occasion for updating. Furthermore, the method 200B, at step S208, performs updating the operating power or the operating channel based at least in part on the power constraints on the available frequency spectrum at the occasion for updating by restarting the wireless communication interface.

Figure 4:
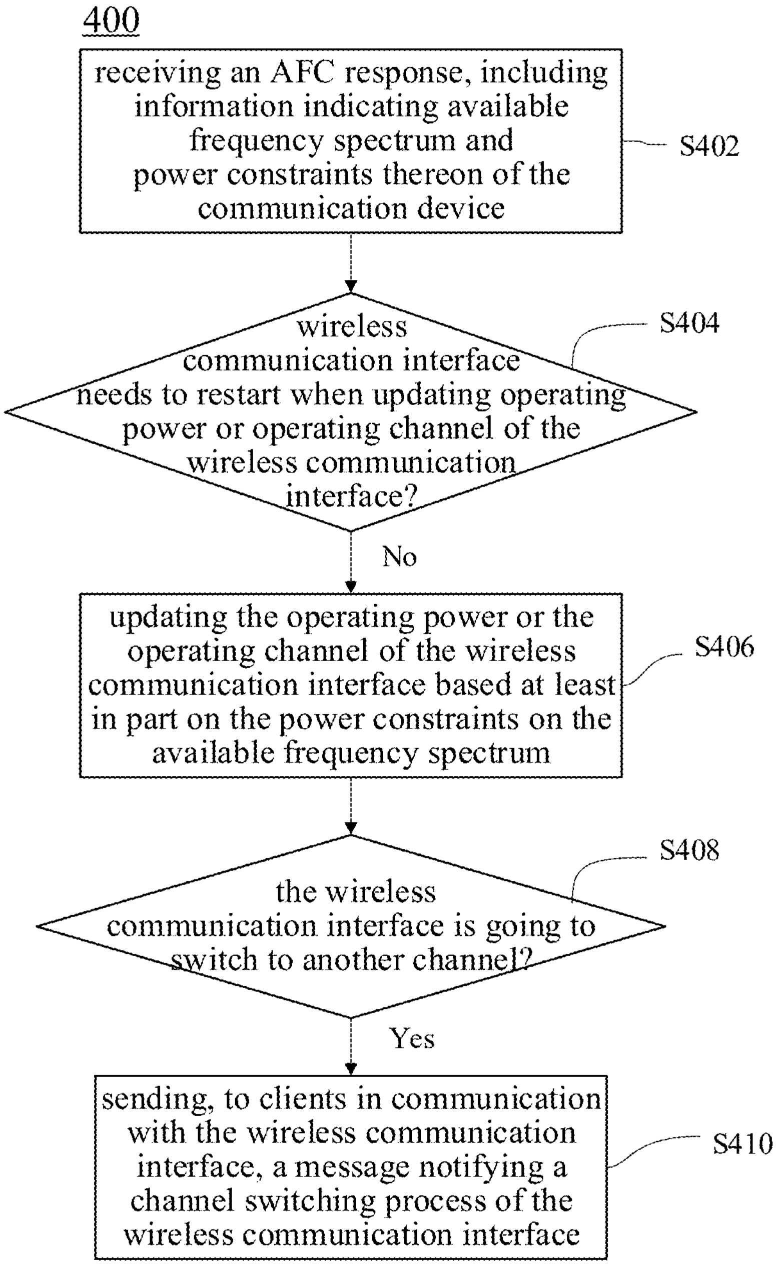
FIG. 4 shows a flowchart illustrating another exemplary method 400 for AFC authentication of a communication device in accordance with some embodiments of the present disclosure.

The determination at step S204 may indicate that a wireless communication interface of the communication device does not need to restart when updating operating power or operating channel of the wireless communication interface, i.e., it is not required to restart the wireless communication interface (which may also be referred as RF chip). FIG. 4 illustrates such circumstances. Specifically, FIG. 4 shows a flowchart illustrating another exemplary method 400 for AFC authentication of a communication device in accordance with some embodiments of the present disclosure. Steps S402-S404 in FIG. 4 are the same as steps S202-S204 in FIG. 2B.

In response to the wireless communication interface not restarting when updating the operating power or operating channel of the wireless communication interface ("No") determined at step S404, the method 400, at step S406, includes directly updating the operating power or the operating channel of the wireless communication interface based at least in part on the power constraints on the available frequency spectrum without restarting the wireless communication interface. With different strategies for updating the operating power or the operating channel of different types of wireless communication interface, the methods in accordance with the embodiments of the present discourse could be compatible with different types of communication chips.

For the power constraints on the available frequency spectrum, the wireless communication interface may not be capable of operating on the current channel owing to the situation that for example the updated power constraint on the current operating channel may not satisfy a minimum operational power for the AP (which herein referred to as AFC device) on the channel. Under such circumstances, the wireless communication interface may switch to another channel for operation. In some embodiments, as mentioned above, the AP may select an optimal channel according to the available frequency spectrum as an operating channel. The method 400, at step S408, includes determining whether the wireless communication interface is going to switch to another channel. In response to the wireless communication interface being going to switch to another channel, the method 400, at step S410, includes sending, to clients (e.g., the first client device 114, the second client device 116 or the third client device 118 in FIG. 1) in communication with the wireless communication interface, a message notifying a channel switching process of the wireless communication interface, for example by a mechanism such as Channel Switch Announcement (CSA) frame. With the operations at step S410, the clients and the wireless communication interface may switch to the new channel simultaneously, maintaining the communication connection between the client and the RF chip. It should be appreciated that the steps S408 and S410 may apply to wireless communication interfaces that restart when updating operating power or operating channel.

Figure 5:
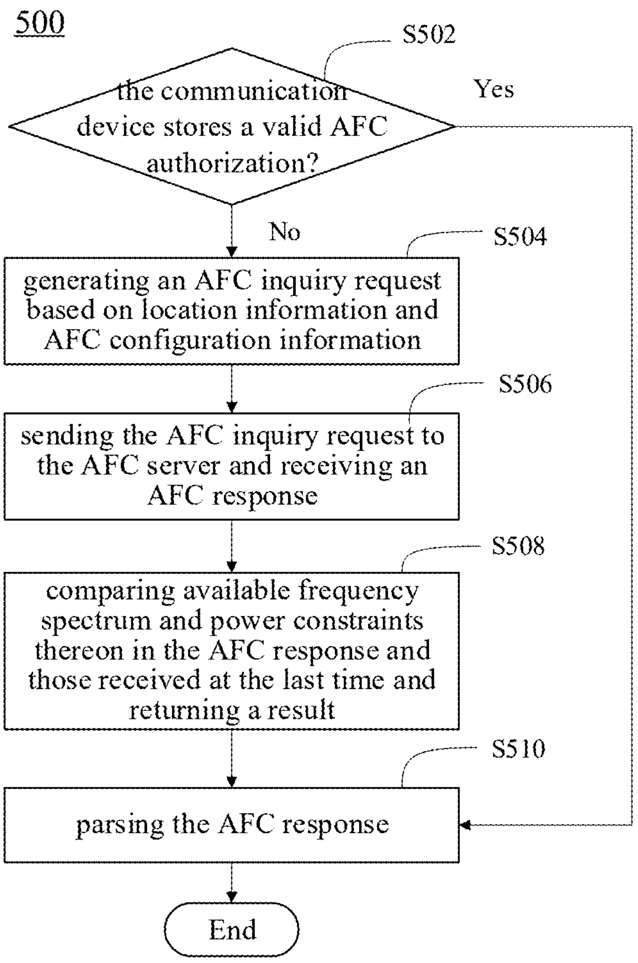
FIG. 5 shows a flowchart illustrating yet another exemplary method 500 for AFC authentication of a communication device in accordance with some embodiments of the present disclosure.

FIG. 5 shows a flowchart illustrating yet another exemplary method 500 for AFC authentication of a communication device in accordance with some embodiments of the present disclosure. The method 500, at step S502, begins with determining whether the communication device (which may also be referred to as AFC device herein, e.g., standalone AP 112 in FIG. 1) stores a valid AFC authorization. In some embodiments, the AFC authorization may include available channel(s) (for example, a channel list) to the AFC device, the corresponding maximum transmit power that may be used in the available channel(s) and its validity period. The valid AFC authorization refers to that the AFC authorization has not expired, i.e., the validity period of the AFC authorization has not passed. If the AFC device stores a valid AFC authorization ("Yes" determined at step S502), the method 500 may proceed to step S510, parsing the AFC response.

In response to the communication device storing no valid AFC authorization ("No" determined at step S502), the method 500 may proceed to step S504. At step S506, an AFC inquiry request is generated based on location information and AFC configuration information. In some embodiments, the AFC configuration information may include the type of the wireless communication interface (e.g., RF chip) of the AFC device. At step S506, the AFC inquiry request is sent to an AFC server (e.g., AFC server 102 in FIG. 1), and an AFC response is received from the AFC server.

After receiving the AFC response, the AFC device may obtain available frequency spectrum and power constraints thereon from power and frequency fields in the AFC response. The method 500, at step 508, includes comparing available frequency spectrum and power constraints thereon in the AFC response and those received at the last time and returning a result about whether the operating channel and the operating power of the wireless communication interface (e.g., RF chip) needs to be updated or not. Then, at step S510, the AFC response is parsed according to the returned result. In some embodiments, comparing available frequency spectrum and power constraints thereon in the AFC response and those received at the last time may refer to comparing whether available frequency spectrum and power constraints thereon of the AFC response newly received equals to available frequency spectrum and power constraints thereon of the AFC response received at the last time.

Figure 6:
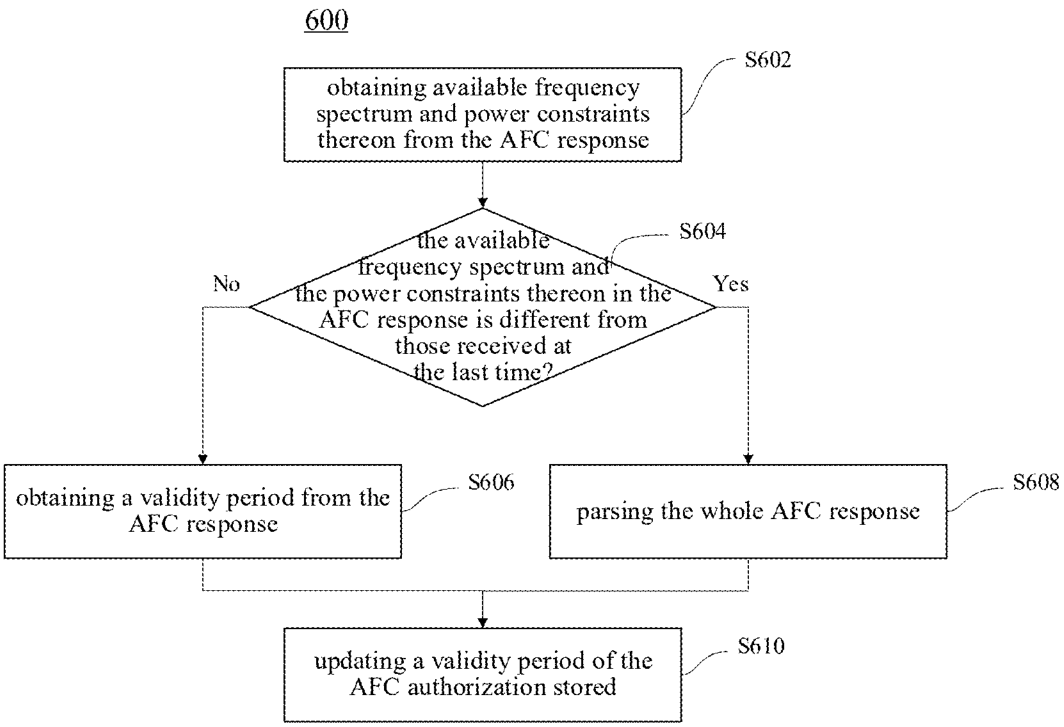
FIG. 6 shows a flowchart illustrating an exemplary process 600 of paring the AFC response at steps S510-S512 in FIG. 5 in accordance with some embodiments of the present disclosure.

Now referring to FIG. 6, the process of paring the AFC response is further explained. FIG. 6 shows a flowchart illustrating an exemplary process 600 of paring the AFC response at steps S508-S510 in FIG. 5 in accordance with some embodiments of the present disclosure. Firstly, after receiving the AFC response, the AFC device may obtain available frequency spectrum and power constraints thereon from the AFC response at step S602, in some embodiments, merely parsing available frequency spectrum and power constraints thereon from power and frequency fields in the AFC response. Then, at step S604, comparing the available frequency spectrum and the power constraints thereon in the AFC response and those received at the last time, as mentioned in step S508, and determining whether they are the same. If the available frequency spectrum and the power constraints thereon in the AFC response are the same as those received at the last time, it is determined that the operating channel and the operating power of the wireless communication interface do not need to be updated, and the process 600 proceeds to step S606. That is, if the available frequency spectrum and the power constraints thereon (for example, power constraints on every channel) are not updated, it is not required to parse the whole AFC response. At step S606, obtaining a validity period from the AFC response, for example, by merely parsing a validity period field in the AFC response. It should be appreciated that the validity period may be obtained at the same time of parsing the power and frequency fields in the AFC response at step S602. Then, at step S610, updating the validity period of an AFC authorization stored in the communication device (e.g., AFC device) with the obtained validity period.

If the available frequency spectrum and the power constraints thereon in the AFC response are different from those received at the last time, for example, any of the available channels or power information (for example, power constraint) on at least one of the channels is updated, the process 600 proceeds to step S608. At step S608, the whole AFC response is parsed to obtain a new AFC authorization and its validity period; then, at step S610, the stored AFC authorization is updated with the new AFC authorization and its validity period. In other words, in response to one of available channels or one of power constraints on the available channels in the AFC response is different from that received the last time, the whole AFC response is parsed. Then, owing to change of the power constraint(s) on at least one of the available channels, the AFC device may determine which channel is better, and may reselect its operating channel to a new channel. If the AFC device selects to still operate on the previous channel, it may determine whether or when the operating power on this channel should be updated based on the parsed power constraint on this channel. Therefore, with the above-mentioned arrangements, unnecessary procedures of parsing and configuring may be reduced, saving the computing resources, and improving computing performance.

As mentioned above, the communication device may monitor states of the clients (e.g., whether the clients are associated with multiple operating bands of the communication device), protocol and function supported by the client (e.g., whether the client supports band steering). The communication device may request to a client the states of the client, protocol and function supported by the client, and then obtain such information from the client. With such monitoring, if it is determined that the operating channel or the operating power of the wireless communication interface needs to be updated and that the wireless communication interface needs to be restarted when updating its operating channel or operating power, the client may be switched to another wireless communication interface between the step of determining whether the number of clients being communicating with the wireless communication interface is less than a quantity threshold (step S302) and the step of whether the throughput of the wireless communication interface is less than a throughput threshold (step S304).

Figure 7:
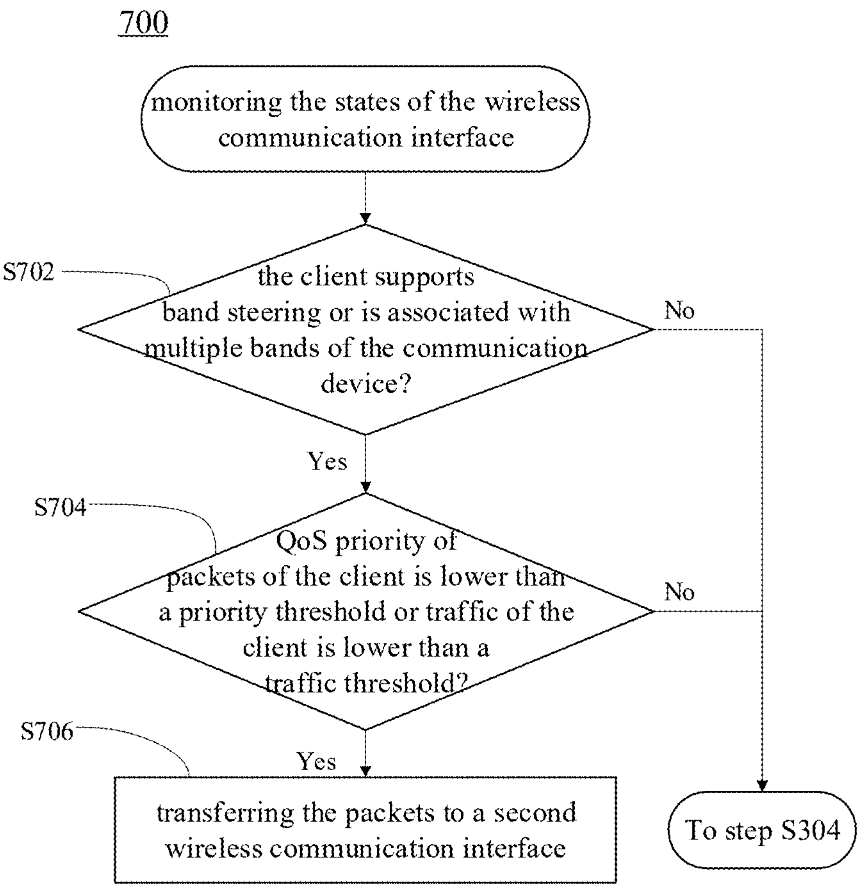
FIG. 7 shows a flowchart illustrating an exemplary process 700 of switching the client to another wireless communication interface in accordance with some embodiments of the present disclosure.

FIG. 7 shows a flowchart illustrating an exemplary process 700 of switching the client to another wireless communication interface in accordance with some embodiments of the present disclosure. The process 700 proceeds under the circumstances that the operating channel or the operating power of the wireless communication interface needs to be updated and the wireless communication interface needs to be restarted when updating its operating channel or operating power. The process 700 begins from monitoring the states of the wireless communication interface. At step 702, it is determined whether the client supports band steering or is associated with multiple bands of the communication device. If it is determined that the client does not support band steering and is not associated with multiple bands of the communication device, the process 700 returns to step 304 in FIG. 3. If it is determined that the client supports band steering or is associated with multiple bands of the communication device, the process 700 proceeds to step S704.

At step S704, it is determined whether QoS priority of packets of the client that communicates with the wireless communication interface (referred to as a first wireless communication interface, which may be a 6 GHz RF chip) is lower than a priority threshold or traffic of the client is lower than a traffic threshold. In some embodiments, the QoS priority of the packets being lower than a priority threshold comprises a situation that the packets belong to a delay insensitive type, for example, BE packets, BK packets and so on. If it is determined that the QoS priority of the packets is not lower than the priority threshold and the traffic of the client is not lower than the traffic threshold, the process 700 returns to step 304 in FIG. 3. If it is determined that the QoS priority of the packets is lower than the priority threshold or the traffic of the client is lower than the traffic threshold, the process 700 proceeds to step S706.

At step S706, the packets are transferred to a second wireless communication interface (e.g., a 2.4 GHz RF chip, a 5 GHz RF chip) that operates at a frequency band different from a frequency band to which the operating channel belongs before updating the operating power of the wireless communication interface at the occasion. In some embodiments, the frequency band on which the second wireless communication interface operates is one of the multiple bands to which the client is associated. In some embodiments, after the operating channel or the operating power of the wireless communication interface has been updated, the client may be transferred back to the first wireless communication interface.

As mentioned above, the AFC inquiry request comprises location information of the AFC device. In some embodiments, the location information is obtained according to a positioning selection method. FIG. 8 shows a flowchart illustrating an exemplary positioning selection method 800 in accordance with some embodiments of the present disclosure.

As shown in FIG. 8, the method 800 begins at step S802, it is determined firstly whether GPS location information of the AFC device is acquirable. In some embodiments, whether the GPS location information is acquirable is determined based on whether the AFC device is associated with a GPS device (internal GPS device or external GPS device) and is able to receive GPS information from the GPS device. If it is determined that the GPS location information is acquirable, the method 800 proceeds to step S804. At step S804, the GPS location information is selected as the location information. If it is determined that the GPS location information is not acquirable, the method 800 proceeds to step S806.

At step S806, it is determined whether cellphone location information is acquirable. In some embodiments, whether the cellphone location information is acquirable is determined based on whether the AFC device is associated with a cellphone and is able to receive cellphone location information. If it is determined that the cellphone location information is acquirable, the method 800 proceeds to step S808. At step S808, the cellphone location information is selected as the location information. If it is determined that the cellphone location information is not acquirable, the method 800 proceeds to step S810.

At step S810, it is determined whether WiFi location information is acquirable. In some embodiments, whether the WiFi location information is acquirable is determined based on whether the AFC device is able to access a location server and to receive signals and device information from a surrounding wireless device. If it is determined that the WiFi location information is acquirable the method 800 proceeds to step S812. At step S812, the WiFi location information is selected as the location information. In some embodiments, the WiFi location information is obtained according to intensities of the signals from the surrounding wireless device and a location of the surrounding wireless device from the location server based on the device information. If it is determined that the WiFi location information is not acquirable, the method 800 proceeds to step S814.

At step S814, it is determined whether network location information is acquirable. In some embodiments, whether the network location information is acquirable is determined based on whether the AFC device is able to access internet and to receive the location information of its IP address. If it is determined that the network location information is acquirable the method 800 proceeds to step S816. At step S816, the network location information is selected as the location information. In some embodiments, the network location information is the location information of the IP address. If it is determined that the network location information is not acquirable, the method 800 proceeds to step S818. At step S818, the location information of the AFC device is set to null. In the circumstances that the location information of the AFC device is null, the AFC device cannot obtain data from the AFC server when performing AFC authentication. In some embodiments, if the communication device (e.g., AP) does not perform AFC authentication, it may operate at a low power indoor (LPI) power.

FIG. 9 shows a system 900 of AFC authentication of a communication device in accordance with some embodiments of the present disclosure. The system 900 of AFC authentication comprises one or more processors 910 and a memory 920 coupled to at least one of the processors 910. A set of computer program instructions are stored in the memory 920. When executed by at least one of the processors 910, the set of computer program instructions perform following series of actions. An AFC response, including information indicating available frequency spectrum and power constraints thereon for the communication device, may be received. An occasion for updating operating power on an operating channel, the operating channel, or the operating channel and the operating power thereon of a wireless communication interface of the communication device based on states of the wireless communication interface may be determined. The operating power on the operating channel, the operating channel, or the operating channel and the operating power thereon may be updated based at least in part on the power constraints on the available frequency spectrum at the occasion for updating.

In an embodiment, the occasion meets one or more of the following conditions: throughput of the wireless communication interface is less than a throughput threshold at the occasion, a number of clients being communicating with the wireless communication interface is less than a quantity threshold at the occasion, the occasion is within a preset updating period of the wireless communication interface, or a validity period of an AFC authorization from the AFC response has not passed at the occasion.

In an embodiment, the determination of the occasion may be in response to a requirement of restarting the wireless communication interface when updating the operating power on the operating channel, the operating channel, or the operating channel and the operating power thereon of the wireless communication interface.

In an embodiment, the updating may be performed by restarting the wireless communication interface.

In an embodiment, the set of computer program instructions may further perform actions of in response to the wireless communication interface being going to switch to another channel, sending, to clients in communication with the wireless communication interface, a message notifying a channel switching process of the wireless communication interface.

In an embodiment, the set of computer program instructions may further perform an action of in response to the communication device storing no valid AFC authorization, sending an AFC inquiry request to an AFC server, wherein the AFC response is responsive to the AFC inquiry request.

In an embodiment, the set of computer program instructions may further perform an action of in response to the available frequency spectrum and the power constraint thereon indicated in the AFC response being different from available frequency spectrum and power constraints thereon received the last time, determining that the operating power on the operating channel, the operating channel, or the operating channel and the operating power thereon of the wireless communication interface needs to be updated.

In an embodiment, the set of computer program instructions may further perform an action of in response to a client being communicating with the wireless communication interface supporting band steering or being associated with multiple operating bands of the communication device, transferring packets of the client that communicates with the wireless communication interface to a second wireless communication interface that operates at a frequency band different from a frequency band to which the operating channel belongs before updating the operating power on the operating channel, the operating channel, or the operating channel and the operating power thereon of the wireless communication interface at the occasion, wherein transferring the packets to the second wireless communication interface is based on a condition that that Quality of Service (QoS) priority of the packets is lower than a priority threshold or traffic of the client is lower than a traffic threshold.

In an embodiment, the QoS priority of packets of the client being lower than a priority threshold comprises a situation that the packets belong to a delay insensitive type.

In an embodiment, the set of computer program instructions may further perform an action of transferring the client back to the wireless communication interface after the operating power on the operating channel, the operating channel, or the operating channel and the operating power thereon of the wireless communication interface has been updated.

In an embodiment, the action of updating the operating power based at least in part on the power constraints on the available frequency spectrum comprising the action of updating the operating power with a minimum value of the power constraint on an available channel selected as the operating channel, a hardware maximum power and an authenticated maximum power of the communication device.

In an embodiment, the set of computer program instructions may further perform an action of in response to the available frequency spectrum and the power constraints thereon indicated in the AFC response being the same as those received last time, parsing only a validity period field in the AFC response.

In an embodiment, the AFC inquiry request comprises location information of the communication device, and the location information is obtained according to a positioning selection method comprising: selecting GPS location information as the location information in response to the GPS location information being acquirable; and in response to the GPS location information being not acquirable: in response to cellphone location information being acquirable, selecting cellphone location information as the location information.

In an embodiment, the positioning selection method further comprises in response to the cellphone location information being not acquirable: in response to WiFi location information being acquirable, selecting the WiFi location information as the location information; and in response to the WiFi location information being not acquirable: in response to network location information being acquirable, selecting the network location information as the location information.

In an embodiment, the set of computer program instructions may further perform actions of reading the operating power of the wireless communication interface on the channel after receiving the AFC response, and in response to the read operating power not meeting the power constraint, updating the operating power of the wireless communication interface based at least in part on the power constraint.

In an embodiment, the set of computer program instructions may further perform actions of selecting an AFC system from a plurality of AFC systems for authentication, wherein the selected AFC system corresponds to the AFC server to which the AFC inquiry request is sent; and obtaining configuration information of the selected AFC system from a cloud, wherein the configuration information is used to authenticate an identity of an AFC system that generates the AFC response. With the authentication of the identity of the AFC system, it is ensured that the AFC response is from a legal AFC system, for example, an AFC system authorized by FCC. In some embodiments, according to the selected AFC system, the authorization may apply one of Mutual Transport Layer Security (mTLS), Token verification, License Validation, and so on. Therefore, the AFC device may adopt to a plurality of kinds of AFC system.

In an embodiment, the AFC response is parsed to a data format that is identifiable by the wireless communication interface, and one API interface of a plurality of API interfaces that match a type of the wireless communication interface is selected to communicate with the wireless communication interface. By selecting the proper API interface, the method may be compatible with RF chips of different manufacturers.

In addition, according to another embodiment of the present disclosure, a computer program product for automated frequency coordination (AFC) authentication of a communication device is disclosed. As an example, the computer program product comprises a non-transitory computer readable storage medium having program instructions embodied therewith, and the program instructions are executable by a processor. When executed, the program instructions cause the processor to perform one or more of the procedures described above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The processor(s) may be an integrated circuit chip with signal processing capability. The processor may be a general processor, a digital signal processor (DSP), an application specific integrated circuit (ASIC), an off-the-shelf programmable gate array (FPGA) or other programmable logic devices, discrete gate or transistor logic devices, and discrete hardware components, for implementing or executing the methods, steps and logic blocks or the operations disclosed in the embodiments of the present application. The general processor may be a microprocessor or any conventional processor, and it may be X84 architecture or ARM architecture.

The nonvolatile storage medium (media) may be read-only memory (ROM), programmable read-only memory (PROM), erasable programmable read-only memory (EPROM), electrically erasable programmable read-only memory (EEPROM) or flash memory. It should be noted that the memories of the methods described in present application are intended to include, but are not limited to, these and any other suitable types of memories.

Reference to an element in the singular is not intended to mean "one and only one" unless specifically so stated, but rather "one or more." Similarly, reference to an element in the plural is not intended to mean "more than one" unless specifically so stated or being contradictory with the description elsewhere, but rather "one or more." Terms such as "if," "when," and "while" should be interpreted to mean "under the condition that" rather than implying an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

It should be noted that the flowcharts and block diagrams in the attached drawings illustrate the possible architectures, functions and operations of the methods and apparatuses according to various embodiments of the present application. In this regard, each block in the flowchart or block diagram may represent a module, a program segment, or a part of code, which contains at least one executable instruction for implementing a specified logical function. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Throughout the description and claims of this specification, the word "comprise" and variations of the word, such as "comprising" and "comprises," means "including but not limited to," and is not intended to exclude, for example, other additives, components, integers or steps. "Exemplary" means "an example of and is not intended to convey an indication of a preferred or ideal embodiment. "Such as" is not used in a restrictive sense, but for explanatory purposes.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference signs in the claims shall not be construed so as to limit their scope.

What is claimed is:

1. A method for Automated Frequency Coordination (AFC) authentication of a communication device, comprising:

receiving an AFC response, including information indicating available frequency spectrum and power constraints thereon for the communication device;

determining an occasion for updating operating power on an operating channel, the operating channel, or the operating channel and the operating power thereon of a wireless communication interface of the communication device based on states of the wireless communication interface; and updating the operating power on the operating channel, the operating channel, or the operating channel and the operating power thereon based at least in part on the power constraints on the available frequency spectrum at the occasion for updating.

2. The method of claim 1, wherein the occasion meets one or more of the following conditions:

throughput of the wireless communication interface is less than a throughput threshold at the occasion, a number of clients being communicating with the wireless communication interface is less than a quantity threshold at the occasion, the occasion is within a preset updating period of the wireless communication interface, or a validity period of an AFC authorization from the AFC response has not passed at the occasion.

3. The method of claim 1, wherein the determination of the occasion is in response to a requirement of restarting the wireless communication interface when updating the operating power on the operating channel, the operating channel, or the operating channel and the operating power thereon of the wireless communication interface.

4. The method of claim 1, wherein the updating is performed by restarting the wireless communication interface.

5. The method of claim 1, wherein the available frequency spectrum comprises at least one of available frequency ranges or available channels.

6. The method of claim 1, further comprising:

in response to the wireless communication interface being going to switch to another channel, sending, to clients in communication with the wireless communication interface, a message notifying a channel switching process of the wireless communication interface.

7. The method of claim 1, further comprising:

in response to the communication device storing no valid AFC authorization, sending an AFC inquiry request to an AFC server, wherein the AFC response is responsive to the AFC inquiry request.

8. The method of claim 1, further comprising:

in response to the available frequency spectrum and the power constraint thereon indicated in the AFC response being different from available frequency spectrum and power constraints thereon received last time, determining that the operating power on the operating channel, the operating channel, or the operating channel and the operating power thereon of the wireless communication interface needs to be updated.

9. The method of claim 1, further comprising:

in response to a client being communicating with the wireless communication interface supporting band steering or being associated with multiple operating bands of the communication device, transferring packets of the client that communicates with the wireless communication interface to a second wireless communication interface that operates at a frequency band different from a frequency band to which the operating channel belongs before updating the operating power on the operating channel, the operating channel, or the operating channel and the operating power thereon of the wireless communication interface at the occasion, wherein transferring the packets to the second wireless communication interface is based on a condition that that Quality of Service (QoS) priority of the packets is lower than a priority threshold or traffic of the client is lower than a traffic threshold.

10. The method of claim 9, further comprising:

transferring the client back to the wireless communication interface after the operating power on the operating channel, the operating channel, or the operating channel and the operating power thereon of the wireless communication interface has been updated.

11. The method of claim 9, wherein the QoS priority of packets of the client being lower than a priority threshold comprises a situation that the packets belong to a delay insensitive type.

12. The method of claim 1, wherein updating the operating power based at least in part on the power constraints on the available frequency spectrum comprising:

updating the operating power with a minimum value of the power constraint on an available channel selected as the operating channel, a hardware maximum power and an authenticated maximum power of the communication device.

13. The method of claim 1, further comprising:

in response to the available frequency spectrum and the power constraints thereon indicated in the AFC response being the same as those received last time, parsing only a validity period field in the AFC response.

14. The method of claim 7, wherein the AFC inquiry request comprises location information of the communication device, wherein the location information is obtained according to a positioning selection method comprising:

selecting GPS location information as the location information in response to a determination that the GPS location information is acquirable; and in response to the GPS location information being not acquirable:

in response to cellphone location information being acquirable, selecting cellphone location information as the location information.

15. The method of claim 14, wherein the positioning selection method further comprises:

in response to the cellphone location information being not acquirable:

in response to WiFi location information being acquirable, selecting the WiFi location information as the location information; and in response to the WiFi location information being not acquirable:

in response to network location information being acquirable, selecting the network location information as the location information.

16. The method of claim 1, further comprising:

reading the operating power of the wireless communication interface on the channel after receiving the AFC response; and in response to the read operating power not meeting the power constraint, updating the operating power of the wireless communication interface based at least in part on the power constraint.

17. The method of claim 7, further comprising:

selecting an AFC system from a plurality of AFC systems for authentication, wherein the selected AFC system corresponds to the AFC server to which the AFC inquiry request is sent; and obtaining configuration information of the selected AFC system from a cloud, wherein the configuration information is used to authenticate an identity of an AFC system that generates the AFC response.

18. The method of claim 1, wherein the AFC response is parsed to a data format that is identifiable by the wireless communication interface, and one API interface of a plurality of API interfaces that match a type of the wireless communication interface is selected to communicate with the wireless communication interface.

19. A communication device, comprising:
- one or more processors;
- a memory coupled to at least one of the processors; and
- a set of computer program instructions stored in the memory, which, when executed by at least one of the processors, perform actions of:
  - receiving an Automated Frequency Coordination (AFC) response, including information indicating available frequency spectrum and power constraints thereon for the communication device;
  - determining an occasion for updating operating power on an operating channel, the operating channel, or the operating channel and the operating power thereon of a wireless communication interface of the communication device based on states of the wireless communication interface; and
  - updating the operating power on the operating channel, the operating channel, or the operating channel and the operating power thereon based at least in part on the power constraints on the available frequency spectrum at the occasion for updating.

20. A computer program product for Automated Frequency Coordination (AFC) authentication of a communication device, the computer program product comprising a non-transitory computer readable storage medium having program instructions embodied therewith, the program instructions executable by a processor to cause the processor to:
- receive an AFC response, including information indicating available frequency spectrum and power constraints of the communication device; and
- determine an occasion for updating operating power on an operating channel, the operating channel, or the operating channel and the operating power thereon of a wireless communication interface of the communication device based on states of the wireless communication interface; and
- update the operating power on the operating channel, the operating channel, or the operating channel and the operating power thereon based at least in part on the power constraints on the available frequency spectrum at the occasion for updating.

* * * * *